United States Patent
Yamauchi (12)

(10) Patent No.: US 12,224,398 B2
(45) Date of Patent: Feb. 11, 2025

(54) ALL-SOLID-STATE SODIUM ION SECONDARY BATTERY

(71) Applicant: NIPPON ELECTRIC GLASS CO., LTD., Otsu (JP)

(72) Inventor: Hideo Yamauchi, Otsu (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 0 days.

(21) Appl. No.: 16/617,147

(22) PCT Filed: Jun. 7, 2018

(86) PCT No.: PCT/JP2018/021803
§ 371 (c)(1),
(2) Date: Nov. 26, 2019

(87) PCT Pub. No.: WO2019/003846
PCT Pub. Date: Jan. 3, 2019

(65) Prior Publication Data
US 2020/0112055 A1    Apr. 9, 2020

(30) Foreign Application Priority Data
Jun. 28, 2017  (JP) ................. 2017-126402

(51) Int. Cl.
*H01M 10/0562* (2010.01)
*H01M 10/054* (2010.01)
*H01M 4/02* (2006.01)

(52) U.S. Cl.
CPC ..... *H01M 10/0562* (2013.01); *H01M 10/054* (2013.01); *H01M 2004/027* (2013.01); *H01M 2004/028* (2013.01)

(58) Field of Classification Search
None
See application file for complete search history.

(56) References Cited

U.S. PATENT DOCUMENTS

| 5,512,387 A | 4/1996 | Ovshinsky |
| 2014/0050974 A1 | 2/2014 | Miyuki et al. |

(Continued)

FOREIGN PATENT DOCUMENTS

| EP | 0 046 357 A1 | 2/1982 |
| GB | 1 507 157 A | 4/1978 |

(Continued)

OTHER PUBLICATIONS

WO-2015087734-A1 (Year: 2015).*

(Continued)

*Primary Examiner* — Yoshitoshi Takeuchi
(74) *Attorney, Agent, or Firm* — Keating & Bennett, LLP (57) ABSTRACT

Provided is an all-solid-state sodium ion secondary battery in which electrode layers are difficult to peel from a solid electrolyte layer and which has excellent cycle characteristics. An all-solid-state sodium ion secondary battery 1 according to the present invention includes: a solid electrolyte layer 2 having a first principal surface 2a and a second principal surface 2b opposite each other and made of a sodium ion-conductive oxide; a positive electrode layer 3 provided on the first principal surface 2a of the solid electrolyte layer 2; and a negative electrode layer 4 provided on the second principal surface 2b of the solid electrolyte layer 2, wherein at least one of the first principal surface 2a and the second principal surface 2b has an arithmetic mean roughness Ra of 0.05 μm or more.

4 Claims, 1 Drawing Sheet

(56) References Cited

U.S. PATENT DOCUMENTS

| | | | | |
|---|---|---|---|---|
| 2015/0180024 A1* | 6/2015 | Nose | ............... | H01M 4/5805 |
| | | | | 429/223 |
| 2015/0357645 A1* | 12/2015 | Morita | ............... | H01M 4/60 |
| | | | | 568/732 |
| 2016/0329539 A1* | 11/2016 | Kawaji | ............... | H01M 10/052 |
| 2017/0005324 A1* | 1/2017 | Stevens | ............ | H01M 10/0525 |
| 2017/0005337 A1* | 1/2017 | Ikejiri | ............... | H01M 10/054 |
| 2017/0092987 A1* | 3/2017 | Haga | ............... | H01M 10/0585 |
| 2017/0317334 A1 | 11/2017 | Yura et al. | | |
| 2018/0183094 A1 | 6/2018 | Ikejiri et al. | | |
| 2018/0309165 A1* | 10/2018 | Yersak | ............... | H01M 10/058 |

FOREIGN PATENT DOCUMENTS

| | | |
|---|---|---|
| JP | 05-205741 A | 8/1993 |
| JP | 2000-128627 A | 5/2000 |
| JP | 2010-108809 A | 5/2010 |
| WO | 2013/187160 A1 | 12/2013 |
| WO | WO-2015087734 A1 * | 6/2015 ............... H01B 1/08 |
| WO | WO-2015092267 A1 * | 6/2015 ............... C25D 3/42 |
| WO | WO-2015128982 A1 * | 9/2015 .......... H01M 10/052 |
| WO | 2015/151144 A1 | 10/2015 |
| WO | 2016/117499 A1 | 7/2016 |
| WO | 2017/006591 A1 | 1/2017 |
| WO | 2017/026285 A1 | 2/2017 |

OTHER PUBLICATIONS

English translation of Official Communication issued in International Patent Application No. PCT/JP2018/021803, mailed on Jan. 9, 2020.

English translation of Official Communication issued in International Patent Application No. PCT/JP2018/021803, mailed on Sep. 11, 2018.

Official Communication issued in International Patent Application No. PCT/JP2018/021803, mailed on Sep. 11, 2018.

Official Communication issued in corresponding Japanese Patent Application No. 2019-526756, mailed on Aug. 16, 2022.

Official Communication issued in corresponding Chinese Patent Application No. 201880015816.8, mailed on Apr. 22, 2022.

\* cited by examiner

ALL-SOLID-STATE SODIUM ION SECONDARY BATTERY

TECHNICAL FIELD

The present invention relates to all-solid-state sodium ion secondary batteries including a solid electrolyte layer made of a sodium ion-conductive oxide.

BACKGROUND ART

Lithium ion secondary batteries are used as high-capacity and light-weight batteries in the fields of mobile devices, electric vehicles, and so on. However, in the lithium ion secondary batteries, flammable organic electrolytic solutions are mainly used as electrolytes. Although organic electrolytic solutions exhibit high ionic conductivity, their liquidity and flammability present safety problems, such as potential ignition and liquid leakage, in the case of use in power storage devices. To solve these safety problems, development of all-solid-state lithium ion secondary batteries employing a solid electrolyte instead of an organic electrolytic solution has been advanced (Patent Literature 1).

Meanwhile, in relation to lithium for use in all-solid-state lithium ion secondary batteries, there are concerns about global rise in raw material costs, global depletion of the raw materials, and so on. In these circumstances, sodium ions are drawing attention as an alternative to lithium ions and development of all-solid-state sodium ion secondary batteries has also been advanced (Patent Literature 2).

In an all-solid-state sodium ion secondary battery disclosed in Patent Literature 2, both the surfaces of a solid electrolyte layer having sodium ion conductivity are provided with respective electrode layers made of an electrode composite (a positive electrode composite or a negative electrode composite). The above electrode layer is formed by applying onto a principal surface of the solid electrolyte layer a slurry containing an active material crystal precursor powder (a positive-electrode active material crystal precursor powder or a negative-electrode active material crystal precursor powder) and a sodium ion-conductive crystal powder, drying the slurry, and then firing the slurry.

CITATION LIST

Patent Literature

[PTL 1]
JP-A-H05-205741
[PTL 2]
WO2015/087734

SUMMARY OF INVENTION

Technical Problem

However, in an all-solid-state sodium ion secondary battery as in Patent Literature 2, electrode layers may be peeled from a solid electrolyte layer during formation of the electrode layers or repeated charge and discharge. Therefore, in the all-solid-state sodium ion secondary battery as in Patent Literature 2, the charge/discharge capacity decreases, so that the cycle characteristics may degrade.

An object of the present invention is to provide an all-solid-state sodium ion secondary battery in which electrode layers are difficult to peel from a solid electrolyte layer and which has excellent cycle characteristics.

Solution to Problem

An all-solid-state sodium ion secondary battery according to the present invention includes: a solid electrolyte layer having a first principal surface and a second principal surface opposite each other and made of a sodium ion-conductive oxide; a positive electrode layer provided on the first principal surface of the solid electrolyte layer; and a negative electrode layer provided on the second principal surface of the solid electrolyte layer, wherein at least one of the first principal surface and the second principal surface has an arithmetic mean roughness Ra of 0.05 μm or more.

In the all-solid-state sodium ion secondary battery according to the present invention, both of the first principal surface and the second principal surface preferably have an arithmetic mean roughness Ra of 0.05 μm or more.

In the all-solid-state sodium ion secondary battery according to the present invention, the solid electrolyte layer preferably has a thickness of not less than 10 μm and not more than 500 μm.

In the all-solid-state sodium ion secondary battery according to the present invention, the solid electrolyte layer preferably contains at least one solid electrolyte selected from the group consisting of β-alumina, β"-alumina, and NASICON crystals.

Advantageous Effects of Invention

The present invention enables provision of an all-solid-state sodium ion secondary battery in which electrode layers are difficult to peel from a solid electrolyte layer and which has excellent cycle characteristics.

DESCRIPTION OF EMBODIMENTS

Hereinafter, a description will be given of a preferred embodiment. However, the following embodiment is merely illustrative and the present invention is not intended to be limited to the following embodiment. Throughout the drawings, members having substantially the same functions may be referred to by the same reference characters.

Figure 1:
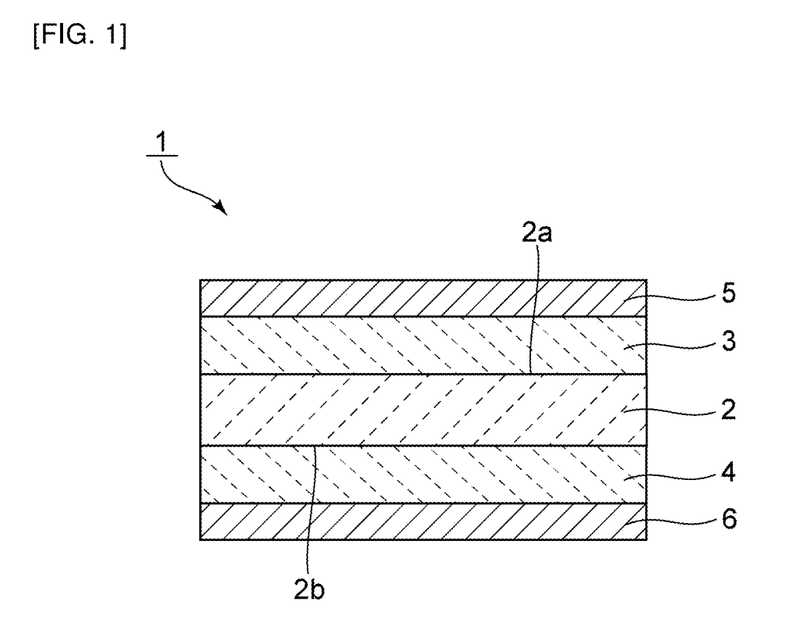
FIG. 1 is a schematic cross-sectional view showing an all-solid-state sodium ion secondary battery according to an embodiment of the present invention.

FIG. 1 is a schematic cross-sectional view showing an all-solid-state sodium ion secondary battery according to an embodiment of the present invention. As shown in FIG. 1, an all-solid-state sodium ion secondary battery 1 according to this embodiment includes a solid electrolyte layer 2, a positive electrode layer 3, a negative electrode layer 4, a first current collector layer 5, and a second current collector layer 6.

The solid electrolyte layer 2 is made of a sodium ion-conductive oxide. Furthermore, the solid electrolyte layer 2 has a first principal surface 2a and a second principal surface 2b opposite each other.

The positive electrode layer 3 is provided on the first principal surface 2a of the solid electrolyte layer 2. The positive electrode layer 3 contains a positive-electrode active material capable of absorbing and releasing sodium. The first current collector layer 5 is provided on a principal surface of the positive electrode layer 3 opposite to the solid electrolyte layer 2. Note that in the present invention the first current collector 5 may not necessarily be provided.

On the other hand, the negative electrode layer 4 is provided on the second principal surface 2b of the solid electrolyte layer 2. The negative electrode layer 4 contains a negative-electrode active material capable of absorbing and releasing sodium. The second current collector layer 6 is provided on a principal surface of the negative electrode layer 4 opposite to the solid electrolyte layer 2. Note that in the present invention the second current collector 6 may not necessarily be provided.

In this embodiment, both of the first principal surface 2a and the second principal surface 2b have an arithmetic mean roughness Ra of 0.05 µm or more. However, in the present invention, at least one of the first principal surface 2a and the second principal surface 2b may have an arithmetic mean roughness Ra of 0.05 µm or more. The arithmetic mean roughness Ra can be measured in conformity with JIS B 0633-2001.

Since, in the all-solid-state sodium ion secondary battery 1 according to this embodiment, at least one of the first principal surface 2a and the second principal surface 2b has an arithmetic mean roughness Ra of 0.05 µm or more as just described, the adhesion at the interface between the solid electrolyte layer 2 and the electrode layer (positive electrode layer 3 or negative electrode layer 4) can be increased by an anchoring effect. Therefore, in the all-solid-state sodium ion secondary battery 1, during formation of electrodes and during repeated charge and discharge, the electrode layers are difficult to peel from the solid electrolyte layer 2 and the charge/discharge capacity is therefore less likely to decrease. Hence, in the all-solid-state sodium ion secondary battery 1, the cycle characteristics are increased.

In addition, since, in the all-solid-state sodium ion secondary battery 1, at least one of the first principal surface 2a and the second principal surface 2b has an arithmetic mean roughness Ra of 0.05 µm or more, both the solid electrolyte 2 and the electrode layer have large specific surface areas. Therefore, the diffusivity of sodium ions from the active material (positive-electrode active material or negative-electrode active material) can be increased, so that the rapid charge/discharge characteristic can be increased.

In further addition, in the all-solid-state sodium ion secondary battery 1, the energy density can also be increased. The reason for this can be explained as follows.

First, if, in the conventional all-solid-state sodium ion secondary battery, the thickness of the electrode layer is increased for the purpose of increasing the energy density, the contraction of the electrode layer becomes larger because of sintering or drying during formation of the electrode layer to be described hereinafter. If the contraction of the electrode layer is large, the electrode layer is easy to peel from an end of the solid electrolyte layer. In addition, oxide-based active materials are low in sodium ion conductivity, sodium ion diffusivity, and electron conductivity. Therefore, if the thickness of the electrode layer is increased for the purpose of increasing the energy density, such an active material as above is much contained in the electrode layer, so that the resistance of the electrode layer may become large. Thus, the rapid charge/discharge characteristic may decrease.

Unlike the above, in the all-solid-state sodium ion secondary battery 1 according to this embodiment, the adhesion at the interface between the solid electrolyte layer 2 and the electrode layer (positive electrode layer 3 or negative electrode layer 4) is increased by an anchoring effect as described previously. Therefore, even when the thickness of the electrode layer is increased, the electrode layer is difficult to peel from the solid electrolyte layer 2. In addition, in the all-solid-state sodium ion secondary battery 1 according to this embodiment, the specific surface areas of both the solid electrolyte layer 2 and the electrode layer are large, so that the diffusivity of sodium ions from the active material (positive-electrode active material or negative-electrode active material) can be increased. Therefore, even when the thickness of the electrode layer is increased, the rapid charge/discharge characteristic can be increased. Since, as just described, in the all-solid-state sodium ion secondary battery 1 according to this embodiment, the electrode layer is difficult to peel from the solid electrolyte layer and the rapid charge/discharge characteristic can be increased, the thickness of the electrode layer can be increased. Thus, the energy density of the all-solid-state sodium ion secondary battery 1 can be increased.

In the present invention, the arithmetic mean roughness Ra of at least one of the first principal surface 2a and the second principal surface 2b is preferably not less than 0.1 µm, more preferably not less than 0.5 µm, and still more preferably not less than 0.8 µm, and preferably not more than 5.5 µm, more preferably not more than 2 µm, and still more preferably not more than 1.7 µm. When the arithmetic mean roughness Ra is equal to or more than the above lower limit, the electrode layer is more difficult to peel from the solid electrolyte layer 2, so that the charge/discharge capacity can be further increased. When the arithmetic mean roughness Ra is equal to or less than the above upper limit, voids are less likely to be created between the solid electrolyte layer 2 and the electrode layer, so that the charge/discharge capacity can be further increased.

In the present invention, the thickness of the solid electrolyte layer 2 is preferably not less than 10 µm, more preferably not less than 50 µm, and still more preferably not less than 150 µm, and preferably not more than 2000 µm, more preferably not more than 500 µm, and still more preferably not more than 200 µm. If the thickness of the solid electrolyte layer 2 is too small, the mechanical strength decreases, the solid electrolyte layer 2 is thus liable to breakage, and an internal short-circuit is likely to develop. If the thickness of the solid electrolyte layer 2 is too large, the distance of sodium ion conduction accompanying charge and discharge becomes long and the internal resistance therefore becomes high, so that the discharge capacity and the operating voltage are likely to decrease. In addition, the energy density of the all-solid-state sodium ion secondary battery 1 per unit volume tends to decrease.

A description will be given below of the details of the solid electrolyte layer 2, the positive electrode layer 3, the negative electrode layer 4, the first current collector layer 5, and the second current collector layer 6, each for use in the all-solid-state sodium ion secondary battery 1.

(Solid Electrolyte Layer)

A solid electrolyte forming the solid electrolyte layer 2 is made of a sodium ion-conductive oxide. Examples of the sodium ion-conductive oxide include compounds containing: at least one selected from the group consisting of Al, Y, Zr, Si, and P; Na; and O. Specific examples of the compounds include β-alumina, β"-alumina, and NASICON crystals. Preferably, the sodium ion-conductive oxide is β-alumina or β"-alumina. These materials have more excellent sodium ion conductivity.

Examples of the oxide materials containing β-alumina or β"-alumina include those containing, in terms of % by mole, 65% to 98% $Al_2O_3$, 2% to 20% $Na_2O$, and 0.3% to 15% $MgO+Li_2O$. Reasons why the composition is limited as above will be described below. Note that in the following description "%" refers to "% by mole" unless otherwise stated. Furthermore, "(component)+(component)+ . . . " means the total sum of the contents of the relevant components.

$Al_2O_3$ is a main component of β-alumina or β"-alumina. The content of $Al_2O_3$ is preferably 65% to 98% and more preferably 70% to 95%. If $Al_2O_3$ is too little, the sodium ion conductivity is likely to decrease. On the other hand, if $Al_2O_3$ is too much, α-alumina, which has no sodium ion conductivity, remains, so that the sodium ion conductivity is likely to decrease.

$Na_2O$ is a component that gives sodium ion conductivity to the solid electrolyte. The content of $Na_2O$ is preferably 2% to 20%, more preferably 3% to 18%, and still more preferably 4% to 16%. If $Na_2O$ is too little, the above effect is less likely to be achieved. On the other hand, if $Na_2O$ is too much, surplus sodium forms compounds not contributing to sodium ion conductivity, such as $NaAlO_2$, so that the sodium ion conductivity is likely to decrease.

MgO and $Li_2O$ are components (stabilizers) that stabilize the structures of β-alumina and β"-alumina. The content of $MgO+Li_2O$ is preferably 0.3% to 15%, more preferably 0.5% to 10%, and still more preferably 0.8% to 8%. If $MgO+Li_2O$ is too little, α-alumina remains in the solid electrolyte, so that the sodium ion conductivity is likely to decrease. On the other hand, if $MgO+Li_2O$ is too much, MgO or $Li_2O$ having failed to function as a stabilizer remains in the solid electrolyte, so that the sodium ion conductivity is likely to decrease.

The solid electrolyte preferably contains, in addition to the above components, $ZrO_2$ or $Y_2O_3$. $ZrO_2$ and $Y_2O_3$ have the effect of suppressing abnormal grain growth of β-alumina and/or β"-alumina during firing of raw materials to produce a solid electrolyte and thus further increasing the adhesion of particles of β-alumina and/or β"-alumina. The content of $ZrO_2$ is preferably 0% to 15%, more preferably 1% to 13%, and still more preferably 2% to 10%. The content of $Y_2O_3$ is preferably 0% to 5%, more preferably 0.01% to 4%, and still more preferably 0.02% to 3%. If $ZrO_2$ or $Y_2O_3$ is too much, the amount of β-alumina and/or β"-alumina produced decreases, so that the sodium ion conductivity is likely to decrease.

Examples of the NASICON crystals include those containing crystals represented by a general formula $Na_sAl_tA2_uO_v$ (where A1 is at least one selected from Al, Y, Yb, Nd, Nb, Ti, Hf, and Zr, A2 is at least one selected from Si and P, s=1.4 to 5.2, t=1 to 2.9, u=2.8 to 4.1, and v=9 to 14). In a preferred embodiment of the above crystals, A1 is at least one selected from Y, Nb, Ti, and Zr, s=2.5 to 3.5, t=1 to 2.5, u=2.8 to 4, and v=9.5 to 12. In this case, crystals having more excellent sodium ion conductivity can be obtained. Particularly, monoclinic or trigonal NASICON crystals are preferred because they have even more excellent sodium ion conductivity.

Specific examples of the crystal represented by the above general formula $Na_sAl_tA2_uO_v$ include $Na_3Zr_2Si_2PO_{12}$, $Na_{3.2}Zr_{1.3}Si_{2.2}P_{0.8}O_{10.5}$, $Na_3Zr_{1.6}Ti_{0.4}Si_2PO_{12}$, $Na_3Hf_2Si_2PO_{12}$, $Na_{3.4}Zr_{0.9}Hf_{1.4}Al_{0.6}Si_{1.2}P_{1.8}O_{12}$, $Na_3Zr_{1.7}Nb_{0.24}Si_2PO_{12}$, $Na_{3.6}Ti_{0.2}Y_{0.8}Si_{2.8}O_9$, $Na_3Zr_{1.88}Y_{0.12}Si_2PO_{12}$, $Na_{3.12}Zr_{1.88}Y_{0.12}Si_2PO_{12}$, and $Na_{3.6}Zr_{0.13}Yb_{1.67}Si_{0.11}P_{2.9}O_{12}$.

(Positive Electrode Layer)

No particular limitation is placed on the type of the positive electrode layer 3 to be used so long as it contains a positive-electrode active material capable of absorbing and releasing sodium and functions as a positive electrode layer. The positive-electrode active material may be formed, for example, by firing a positive-electrode active material precursor powder, such as a glass powder. When the positive-electrode active material precursor powder is fired, the positive-electrode active material crystals precipitate and these positive-electrode active material crystals function as a positive-electrode active material.

Examples of the positive-electrode active material crystals functioning as a positive-electrode active material include sodium transition metal phosphate crystals containing Na, M (where M represents at least one transition metal element selected from Cr, Fe, Mn, Co, V, and Ni), P, and O. Specific examples include $Na_2FeP_2O_7$, $NaFePO_4$, $Na_3V_2(PO_4)_3$, $Na_2NiP_2O_7$, $Na_{3.64}Ni_{2.18}(P_2O_7)_2$, and $Na_3Ni_3(PO_4)_2(P_2O_7)$. These sodium transition metal phosphate crystals are preferred because they have high capacities and excellent chemical stability. Preferred among them are triclinic crystals belonging to space group P1 or P–1 and particularly preferred are crystals represented by a general formula $Na_xM_yP_2O_z$ (where $1.2 \le x \le 2.8$, $0.95 \le y \le 1.6$, and $6.5 \le z \le 8$), because these crystals have excellent cycle characteristics. Other positive-electrode active material crystals functioning as a positive-electrode active material include layered sodium transition metal oxide crystals, such as $NaCrO_2$, $Na_{0.7}MnO_2$, and $NaFe_{0.2}Mn_{0.4}Ni_{0.4}O_2$.

Examples of the positive-electrode active material precursor powder include those containing (i) at least one transition metal element selected from Cr, Fe, Mn, Co, Ni, Ti, and Nb, (ii) at least one element selected from P, Si, and B, and (iii) O.

Examples of the positive-electrode active material precursor powder include those containing, particularly in terms of % by mole of oxide, 8% to 55% $Na_2O$, 10% to 70% $CrO+FeO+MnO+CoO+NiO$, and 15% to 70% $P_2O_5+SiO_2+B_2O_3$. Reasons why each of the components is limited as above will be described below. Note that in the following description of the content of each component "%" refers to "% by mole" unless otherwise stated. Furthermore, "(component)+(component)+ . . . " means the total sum of the contents of the relevant components.

$Na_2O$ serves, during charge and discharge, as a supply source of sodium ions that move between the positive-electrode active material and a negative-electrode active material. The content of $Na_2O$ is preferably 8% to 55%, more preferably 15% to 45%, and still more preferably 25% to 35%. If $Na_2O$ is too little, the amount of sodium ions contributing to the absorption and release becomes small, so that the discharge capacity tends to decrease. On the other hand, if $Na_2O$ is too much, other crystals not contributing to charge and discharge, such as $Na_3PO_4$, becomes likely to precipitate, so that the discharge capacity tends to decrease.

CrO, FeO, MnO, CoO, and NiO are components that change the valence of each transition element during charge and discharge to cause a redox reaction and thus act as a drive force for absorption and release of sodium ions. Among them, NiO and MnO have a significant effect of increasing the redox potential. Furthermore, FeO is particularly likely to stabilize the structure during charge and discharge and therefore likely to improve the cycle characteristics. The content of $CrO+FeO+MnO+CoO+NiO$ is preferably 10% to 70%, more preferably 15% to 60%, still more preferably 20% to 55%, yet still more preferably 23% to 50%, particularly preferably 25% to 40%, and most preferably 26% to 36%. If CrO+FeO+MnO+CoO+NiO is too little, the redox reaction accompanying charge and discharge becomes less likely to occur and the amount of sodium ions to be absorbed and released therefore becomes small, so that the discharge capacity tends to decrease. On the other hand, if CrO+FeO+MnO+CoO+NiO is too much, other crystals precipitate, so that the discharge capacity tends to decrease.

$P_2O_5$, $SiO_2$, and $B_2O_3$ each form a three-dimensional network and, therefore, have the effect of stabilizing the structure of the positive-electrode active material. Particularly, $P_2O_5$ and $SiO_2$ are preferred because they have excellent sodium ion conductivity, and $P_2O_5$ is more preferred. The content of $P_2O_5+SiO_2+B_2O_3$ is preferably 15% to 70%, more preferably 20% to 60%, and still more preferably 25% to 45%. If $P_2O_5+SiO_2+B_2O_3$ is too little, the discharge capacity tends to decrease after repeated charge and discharge. On the other hand, if $P_2O_5+SiO_2+B_2O_3$ is too much, other crystals not contributing to charge and discharge, such as $P_2O_5$, tend to precipitate. The content of each of $P_2O_5$, $SiO_2$, and $B_2O_3$ components is preferably 0% to 70%, more preferably 15% to 70%, still more preferably 20% to 60%, and particularly preferably 25% to 45%.

Furthermore, in addition to the above components, various components can be incorporated into the positive-electrode active material without impairing the effects as the positive-electrode active material, so that vitrification can be facilitated. Examples of such components include, in terms of oxides, MgO, CaO, SrO, BaO, ZnO, CuO, $Al_2O_3$, $GeO_2$, $Nb_2O_5$, $TiO_2$, $ZrO_2$, $V_2O_5$, and $Sb_2O_5$. Particularly, $Al_2O_3$ acting as a network forming oxide and $V_2O_5$ serving as an active material component are preferred. The content of the above components is, in total, preferably 0% to 30%, more preferably 0.1% to 20%, and still more preferably 0.5% to 10%.

The preferred positive-electrode active material precursor powder is one capable of forming an amorphous phase together with positive-electrode active material crystals when subjected to firing. When an amorphous phase is formed, the sodium ion conductivity through the positive electrode layer 3 and at the interface between the positive electrode layer 3 and the solid electrolyte layer 2 can be improved.

The average particle diameter of the positive-electrode active material precursor powder is preferably 0.01 μm to 15 μm, more preferably 0.05 μm to 12 μm, and still more preferably 0.1 μm to 10 μm. If the average particle diameter of the positive-electrode active material precursor powder is too small, the cohesion between the positive-electrode active material precursor powder increases, so that the positive-electrode active material precursor powder tends to be poor in dispersibility when made in paste form. As a result, the internal resistance of the battery becomes high, so that the operating voltage is likely to decrease. In addition, the electrode density decreases, so that the battery capacity per unit volume tends to decrease. On the other hand, if the average particle diameter of the active material precursor powder is too large, sodium ions are less likely to diffuse and the internal resistance tends to be high. In addition, the electrode tends to be poor in surface smoothness.

In the present invention, the average particle diameter means D50 (a volume-based average particle diameter) and refers to a value measured by the laser diffraction/scattering method.

The thickness of the positive electrode layer 3 is preferably in a range of 3 μm to 300 μm and more preferably in a range of 10 μm to 150 μm. If the thickness of the positive electrode layer 3 is too small, the capacity of the all-solid-state sodium ion secondary battery 1 itself becomes small, so that the energy density may decrease. If the thickness of the positive electrode layer 3 is too large, the resistance to electron conduction becomes large, so that the discharge capacity and the operating voltage tend to decrease.

The positive electrode layer 3 may contain, if necessary, a solid electrolyte powder. Therefore, the positive electrode layer 3 may be a positive electrode composite which is a composite of the positive-electrode active material and the solid electrolyte powder. The solid electrolyte powder that can be used is a powder of the same material as used for the above-described solid electrolyte layer 2. When the positive electrode layer 3 contains the solid electrolyte powder, the sodium ion conductivity through the positive electrode layer 3 and at the interface between the positive electrode layer 3 and the solid electrolyte layer 2 can be improved. The average particle diameter of the solid electrolyte powder is preferably 0.01 μm to 15 μm, more preferably 0.05 μm to 10 μm, and still more preferably 0.1 μm to 5 μm.

If the average particle diameter of the solid electrolyte powder is too large, the distance taken to conduct sodium ions becomes long, so that the sodium ion conductivity tends to decrease. In addition, the sodium ion conducting path between the positive-electrode active material powder and the solid electrolyte powder tends to reduce. As a result, the discharge capacity is likely to decrease. On the other hand, if the average particle diameter of the solid electrolyte powder is too small, degradation due to elution of sodium ions and reaction thereof with carbon dioxide may occur, so that the sodium ion conductivity is likely to decrease. In addition, voids are likely to be formed, so that the electrode density is likely to decrease. As a result, the discharge capacity tends to decrease.

The volume ratio between the positive-electrode active material precursor powder and the solid electrolyte powder is preferably 20:80 to 95:5, more preferably 30:70 to 90:10, and still more preferably 35:65 to 88:12.

Furthermore, the positive electrode layer 3 may contain, if necessary, a conductive agent, such as carbon powder, and a binder. When a conductive agent is contained in the positive electrode layer 3, the internal resistance of the positive electrode layer 3 can be reduced. The conductive agent is preferably contained in a proportion of 0% to 20% by mass in the positive electrode layer 3 and more preferably contained in a proportion of 1% to 10% by mass.

The preferred binder is polypropylene carbonate (PPC), which is capable of decomposing at low temperatures under an inert atmosphere. Alternatively, carboxymethyl cellulose (CMC), which has excellent sodium ion conductivity, is also preferred.

(Negative Electrode Layer)

No particular limitation is placed on the type of the negative electrode layer 4 to be used so long as it contains a negative-electrode active material capable of absorbing and releasing sodium and functions as a negative electrode layer. The negative-electrode active material may be formed, for example, by firing a negative-electrode active material precursor powder, such as a glass powder. When the negative-electrode active material precursor powder is fired, the negative-electrode active material crystals precipitate and these negative-electrode active material crystals function as a negative-electrode active material.

Examples of the negative-electrode active material crystals functioning as a negative-electrode active material include: crystals containing at least one selected from Nb and Ti, and O; metallic crystals of at least one selected from Sn, Bi, and Sb; and alloy crystals containing at least one selected from Sn, Bi, and Sb.

The crystals containing at least one selected from Nb and Ti, and O are preferred because they have excellent cycle characteristics. If the crystals containing at least one selected from Nb and Ti, and O further contain Na and/or Li, this is preferred because the charge/discharge efficiency (the ratio of discharge capacity to charge capacity) increases and a high charge/discharge capacity can be thus maintained. Above all, if the crystals containing at least one selected from Nb and Ti, and O are orthorhombic, hexagonal, cubic or monoclinic crystals, particularly monoclinic crystals belonging to space group $P2_1/m$, this is more preferred because a capacity decrease is less likely to occur even during charge and discharge at a large current.

An example of the orthorhombic crystals is $NaTi_2O_4$. Examples of the hexagonal crystals include $Na_2TiO_3$, $NaTi_8O_{13}$, $NaTiO_2$, $LiNbO_3$, $LiNbO_2$, $Li_7NbO_6$, and $Li_2Ti_3O_7$. Examples of the cubic crystals include $Na_2TiO_3$, $NaNbO_3$, $Li_4Ti_5O_{12}$, and $Li_3NbO_4$. Examples of the monoclinic crystals include $Na_2Ti_6O_{13}$, $NaTi_2O_4$, $Na_2TiO_3$, $Na_4Ti_5O_{12}$, $Na_2Ti_4O_9$, $Na_2Ti_9O_{19}$, $Na_2Ti_3O_7$, $Na_2Ti_3O_7$, $Li_{1.7}Nb_2O_5$, $Li_{1.9}Nb_2O_5$, $Li_{12}Nb_{13}O_{33}$, and $LiNb_3O_8$. An example of the monoclinic crystals belonging to space group $P2_1/m$ is $Na_2Ti_3O_7$.

The crystals containing at least one selected from Nb and Ti, and O preferably further contains at least one selected from B, Si, P, and Ge. These components have the effect of facilitating the formation of an amorphous phase together with the negative-electrode active material crystals and further increasing the sodium ion conductivity.

Other negative-electrode active materials that can be used include metallic crystals of at least one selected from Sn, Bi, and Sb, alloy crystals containing at least one selected from Sn, Bi, and Sb (for example, Sn—Cu alloy, Bi—Cu alloy or Bi—Zn alloy), and glasses containing at least one selected from Sn, Bi, and Sb. These materials are preferred because they have high capacity and they are less likely to cause a capacity decrease even during charge and discharge at a large current.

Examples of the negative-electrode active material precursor powder include those containing, in terms of % by mole of oxide, 0% to 90% SnO, 0% to 90% $Bi_2O_3$, 0% to 90% $TiO_2$, 0% to 90% $Fe_2O_3$, 0% to 90% $Nb_2O_5$, 5% to 75% $SiO_2+B_2O_3+P_2O_8$, and 0% to 80% $Na_2O$. With the above composition, a structure is formed in which Sn ions, Bi ions, Ti ions, Fe ions or Nb ions each serving as a negative-electrode active material component are homogeneously dispersed in an oxide matrix containing Si, B or P. Furthermore, when containing $Na_2O$, the negative-electrode active material precursor powder becomes a material having more excellent sodium ion conductivity. As a result, a negative-electrode active material can be obtained which can suppress a volume change during absorption and release of sodium ions and has more excellent cycle characteristics.

Reasons why the composition of the negative-electrode active material precursor powder is limited as above will be described below. Note that in the following description "%" refers to "% by mole" unless otherwise stated. Furthermore, "(component)+(component)+ . . . " means the total sum of the contents of the relevant components.

SnO, $Bi_2O_3$, $TiO_2$, $Fe_2O_3$, and $Nb_2O_5$ are negative-electrode active material components serving as sites where alkali ions are absorbed and released. When the negative-electrode active material precursor powder contains any of these components, the discharge capacity of the negative-electrode active material per unit mass becomes larger and the charge/discharge efficiency (the ratio of discharge capacity to charge capacity) at the first charge and discharge is more likely to be increased. However, if the content of these components is too large, the volume change due to absorption and release of sodium ions during charge and discharge becomes unable to be reduced, so that the cycle characteristics tend to decrease. In view of the above circumstances, the respective preferred ranges of contents of the above components are as follows.

The content of SnO is preferably 0% to 90%, more preferably 45% to 85%, still more preferably 55% to 75%, and particularly preferably 60% to 72%.

The content of $Bi_2O_3$ is preferably 0% to 90%, more preferably 10% to 70%, still more preferably 15% to 65%, and particularly preferably 25% to 55%.

The content of $TiO_2$ is preferably 0% to 90%, more preferably 5% to 72%, still more preferably 10% to 68%, yet still more preferably 12% to 58%, particularly preferably 15% to 49%, and most preferably 15% to 39%.

The content of $Fe_2O_3$ is preferably 0% to 90%, more preferably 15% to 85%, still more preferably 20% to 80%, and particularly preferably 25% to 75%.

The content of $Nb_2O_5$ is preferably 0% to 90%, more preferably 7% to 79%, still more preferably 9% to 69%, yet still more preferably 11% to 59%, particularly preferably 13% to 49%, and most preferably 15% to 39%. Note that $SnO+Bi_2O_3+TiO_2+Fe_2O_3+Nb_2O_5$ is preferably 0% to 90%, more preferably 5% to 85%, and still more preferably 10% to 80%.

$SiO_2$, $B_2O_3$, and $P_2O_5$ are network forming oxides and have the effect of surrounding sodium-ion absorption and release sites in the above negative active material components to further increase the cycle characteristics. Among them, $SiO_2$ and $P_2O_5$ not only further increase the cycle characteristics but also have excellent sodium ion conductivity, and therefore have the effect of further increasing the rate characteristic.

$SiO_2+B_2O_3+P_2O_5$ is preferably 5% to 85%, more preferably 6% to 79%, still more preferably 7% to 69%, yet still more preferably 8% to 59%, particularly preferably 9% to 49%, and most preferably 10% to 39%. If $SiO_2+B_2O_3+P_2O_5$ is too little, the volume change of the negative-electrode active material components due to absorption and release of sodium ions during charge and discharge becomes unable to be reduced, so that a structural collapse occurs and, thus, the cycle characteristics is likely to decrease. On the other hand, if $SiO_2+B_2O_3+P_2O_5$ is too much, the content of the negative-electrode active material components becomes relatively small, so that the charge/discharge capacity of the negative-electrode active material per unit mass tends to be small.

The respective preferred ranges of contents of $SiO_2$, $B_2O_3$, and $P_2O_5$ are as follows.

The content of $SiO_2$ is preferably 0% to 75%, more preferably 5% to 75%, still more preferably 7% to 60%, yet still more preferably 10% to 50%, particularly preferably 12% to 40%, and most preferably 20% to 35%. If the content of $SiO_2$ is too large, the discharge capacity is likely to decrease.

The content of $P_2O_5$ is preferably 5% to 75%, more preferably 7% to 60%, still more preferably 10% to 50%, particularly preferably 12% to 40%, and most preferably 20% to 35%. If the content of $P_2O_5$ is too small, the above effect is less likely to be achieved. On the other hand, if the content of $P_2O_5$ is too large, the discharge capacity is likely to decrease and the water resistance is likely to decrease. In addition, upon preparation of an aqueous electrode paste, undesirable other crystals are produced to thus break the $P_2O_5$ network, so that the cycle characteristics are likely to decrease.

The content of $B_2O_3$ is preferably 0% to 75%, more preferably 5% to 75%, still more preferably 7% to 60%, yet still more preferably 10% to 50%, particularly preferably 12% to 40%, and most preferably 20% to 35%. If the content of $B_2O_3$ is too large, the discharge capacity is likely to decrease and the chemical durability is likely to decrease.

The preferred negative-electrode active material precursor powder is one capable of forming an amorphous phase together with negative-electrode active material crystals when subjected to firing. When an amorphous phase is formed, the sodium ion conductivity through the negative electrode layer 4 and at the interface between the negative electrode layer 4 and the solid electrolyte layer 2 can be improved.

The average particle diameter of the negative-electrode active material precursor powder is preferably 0.01 μm to 15 μm, more preferably 0.05 μm to 12 μm, and still more preferably 0.1 μm to 10 μm. If the average particle diameter of the negative-electrode active material precursor powder is too small, the cohesion between the negative-electrode active material precursor powder increases, so that the negative-electrode active material precursor powder tends to be poor in dispersibility when made in paste form. As a result, the internal resistance of the battery becomes high, so that the operating voltage is likely to decrease. In addition, the electrode density decreases, so that the battery capacity per unit volume tends to decrease. On the other hand, if the average particle diameter of the negative-electrode active material precursor powder is too large, sodium ions are less likely to diffuse and the internal resistance tends to be high. In addition, the electrode tends to be poor in surface smoothness.

In the present invention, the average particle diameter means D50 (a volume-based average particle diameter) and refers to a value measured by the laser diffraction/scattering method.

The thickness of the negative electrode layer 4 is preferably in a range of 0.3 μm to 300 μm and more preferably in a range of 3 μm to 150 μm. If the thickness of the negative electrode layer 4 is too small, the absolute capacity (mAh) of the negative electrode tends to decrease. If the thickness of the negative electrode layer 4 is too large, the resistance becomes large, so that the capacity (mAh/g) tends to decrease.

The negative electrode layer 4 may contain a solid electrolyte powder, a conductive agent, a binder, and so on. When the negative electrode layer 4 contains the solid electrolyte powder and is thus made of a negative electrode composite, the contact interface between the negative-electrode active material and the solid electrolyte powder increases to facilitate the absorption and release of sodium ions during charge and discharge, so that the rate characteristic can be further improved.

The solid electrolyte powder that can be used is a powder of the same material as used for the above-described solid electrolyte layer 2. The average particle diameter of the solid electrolyte powder is preferably 0.01 μm to 15 μm, more preferably 0.05 μm to 10 μm, and still more preferably 0.1 μm to 5 μm.

If the average particle diameter of the solid electrolyte powder is too large, the distance taken to conduct sodium ions becomes long, so that the sodium ion conductivity tends to decrease. In addition, the sodium ion conducting path between the negative-electrode active material powder and the solid electrolyte powder tends to reduce. As a result, the discharge capacity is likely to decrease. On the other hand, if the average particle diameter of the solid electrolyte powder is too small, degradation due to elution of sodium ions and reaction thereof with carbon dioxide may occur, so that the sodium ion conductivity is likely to decrease. In addition, voids are likely to be formed, so that the electrode density is likely to decrease. As a result, the discharge capacity tends to decrease.

The volume ratio between the negative-electrode active material precursor powder and the solid electrolyte powder is preferably 20:80 to 95:5, more preferably 30:70 to 90:10, and still more preferably 35:65 to 88:12.

An example of the conductive agent is carbon powder. When a conductive agent is contained in the negative electrode layer 4, the internal resistance of the negative electrode layer 4 can be reduced. The conductive agent is preferably contained in a proportion of 0% to 20% by mass in the negative electrode layer 4 and more preferably contained in a proportion of 1% to 10% by mass.

The preferred binder is polypropylene carbonate (PPC), which is capable of decomposing at low temperatures under an inert atmosphere. Alternatively, carboxymethyl cellulose (CMC), which has an excellent ionic conductivity, is also preferred.

(First Current Collector Layer and Second Current Collector Layer)

Examples of materials for the first current collector layer 5 and second current collector layer 6 include aluminum, titanium, silver, copper, stainless steel, gold, and alloys of these metals. Furthermore, the thickness of each of the first current collector layer 5 and the second current collector layer 6 is preferably not less than 0.01 μm and preferably not more than 10 μm. When the thicknesses of the first current collector layer 5 and the second current collector layer 6 are equal to or more than the above lower limit, it can be further suppressed that a decrease in electrical conductivity causes an increase in intra-battery resistance and thus a decrease in discharge capacity and the decrease in discharge capacity causes decreases in weight energy density and volume energy density. When the thicknesses of the first current collector layer 5 and the second current collector layer 6 are equal to or less than the above upper limit, the energy density of the all-solid-state sodium ion secondary battery 1 can be further increased.

Although it is preferred that, as in this embodiment, both the first current collector layer 5 and the second current collector layer 6 are provided, only one of the first current collector layer 5 and the second current collector layer 6 may be provided or none of the first current collector layer 5 and the second current collector layer 6 may be provided.

A description will be given below of an example of a method for producing the all-solid-state sodium ion secondary battery 1.

(Method for Producing all-Solid-State Sodium Ion Secondary Battery)

Although no particular limitation is placed on the method for producing the all-solid-state sodium ion secondary battery 1 shown in FIG. 1, the all-solid-state sodium ion secondary battery 1 can be produced, for example, by the following method.

First, a solid electrolyte layer 2 is prepared. The solid electrolyte layer 2 can be produced by mixing the above-described raw material powders, forming the mixed raw material powders into a shape, and then firing them. For example, the solid electrolyte layer 2 can be produced by making the raw material powders into a slurry, forming a green sheet from the slurry, and then firing the green sheet. Alternatively, the solid electrolyte layer 2 may be produced by the sol-gel method.

Next, the first principal surface 2a and second principal surface 2b of the prepared solid electrolyte layer 2 are polished so that their arithmetic mean roughness Ra reaches 0.05 µm or more. Although no particular limitation is placed on the polishing method, the principal surfaces are preferably polished by dry polishing or sandblasting, in which neither water nor polishing liquid is used. In these cases, the decrease in conductivity of sodium ions due to reaction with moisture or the like can be further suppressed. Examples that can be used as a polish for dry polishing or sandblasting include SiC, diamond, and cBN (cubic boron nitride). The particle size of the polish may be, for example, 5 µm to 500 µm.

Next, a positive electrode layer 3 is formed on the first principal surface 2a of the solid electrolyte layer 2. The positive electrode layer 3 can be produced using a slurry containing the active material precursor powder and, if necessary, further containing the solid electrolyte powder and/or the conductive agent in the above proportion. If necessary, a binder, a plasticizer, a solvent, and other additives are added into the slurry. The positive electrode layer 3 can be produced, for example, by applying the above-described slurry onto the first principal surface 2a of the solid electrolyte layer 2, drying the slurry, and then firing the slurry.

Next, a negative electrode layer 4 is formed on the second principal surface 2b of the solid electrolyte layer 2. The negative electrode layer 4 can be produced using a slurry containing the negative-electrode active material precursor powder and, if necessary, further containing the solid electrolyte powder and/or the conductive agent in the above proportion. If necessary, a binder, a plasticizer, a solvent, and other additives are added into the slurry. The negative electrode layer 4 can be produced, for example, by applying the slurry onto the second principal surface 2b of the solid electrolyte layer 2, drying the slurry, and then firing the slurry. However, no particular limitation is placed on the order of formation of the positive electrode layer 3 and the negative electrode layer 4. Therefore, it is possible to first form the negative electrode layer 4 and then form the positive electrode layer 3. Alternatively, the positive electrode layer 3 and the negative electrode layer 4 may be formed by concurrent firing.

Still alternatively, the all-solid-state sodium ion secondary battery 1 may be formed by laying a green sheet for forming a negative electrode layer, a green sheet for forming a solid electrolyte layer, and a green sheet for forming a positive electrode layer one on top of another in this order and firing these green sheets. Each green sheet can be produced, for example, by applying the slurry onto a base material made of PET (polyethylene terephthalate) or other materials, and then drying the slurry.

Next, if necessary, the first current collector layer 5 and the second current collector layer 6 are formed. No particular limitation is placed on the method for forming the first current collector layer 5 and the second current collector layer 6 and examples include: physical vapor deposition methods, such as evaporation coating and sputtering; and chemical vapor deposition methods, such as thermal CVD, MOCVD, and plasma CVD. Other methods for forming the first current collector layer 5 and the second current collector layer 6 include liquid phase deposition methods, such as plating, the sol-gel method, and spin coating. However, it is preferred to form the first current collector layer 5 and the second current collector layer 6 on the positive electrode layer 3 and the negative electrode layer 4, respectively, by sputtering, because excellent adhesion is provided. After the positive electrode layer 3 and the negative electrode layer 4 are formed on the solid electrolyte layer 2, the first current collector layer 5 and the second current collector layer 6 may be formed separately from each other. Alternatively, the all-solid-state sodium ion secondary battery 1 may be obtained by previously producing the first current collector layer 5 on the positive electrode layer 3, also producing the second current collector layer 6 on the negative electrode layer 4, and then combining them.

Since, in the all-solid-state sodium ion secondary battery 1 obtained in the above manner, at least one of the first principal surface 2a and the second principal surface 2b has an arithmetic mean roughness Ra of 0.05 µm or more, the adhesion at the interface between the solid electrolyte layer 2 and the electrode layer (positive electrode layer 3 or negative electrode layer 4) can be increased by an anchoring effect. Therefore, even if sintering or drying during formation of the electrode layer as previously described causes a contraction of a coated layer serving as the electrode layer, the electrode layer is difficult to peel from an end or like portions of the solid electrolyte layer 2. Furthermore, even during repeated charge and discharge, the electrode layer is difficult to peel from the solid electrolyte layer 2. Hence, the all-solid-state sodium ion secondary battery 1 obtained in the above manner has excellent cycle characteristics.

EXAMPLES

Hereinafter, a description will be given of the present invention with reference to its examples, but the present invention is not limited to these examples.

Example 1

(1) Preparation of Positive-Electrode Active Material Precursor Powder

Using as raw materials sodium metaphosphate ($NaPO_3$), nickel oxide (NiO), sodium carbonate ($Na_2CO_3$), and orthophosphoric acid ($H_3PO_4$), powders of these raw materials were formulated to give a composition of, in terms of % by mole, 30.3% $Na_2O$, 36.3% NiO, and 33.3% $P_2O_5$ and melted at 1250° C. for 45 minutes in an air atmosphere. Next, resultant molten glass was poured between a pair of rotating rollers and formed into a shape with rapid cooling, thus obtaining a film-like glass body having a thickness of 0.1 mm to 1 mm. The obtained film-like glass body was ground for 10 hours with a ball mill using 20-mm diameter $ZrO_2$ balls and the ground product was passed through a resin-made sieve with 120 µm openings, thus obtaining a coarse glass powder having an average particle diameter of 7 µm. Next, the coarse glass powder was ground, using ethanol as a grinding aid, for 80 hours with a ball mill using 3-mm diameter $ZrO_2$ balls, thus obtaining a glass powder (positive-electrode active material precursor powder) having an average particle diameter of 0.6 µm. As a result of measurement of X-ray diffraction spectra of the obtained glass powder, the glass powder was confirmed to be amorphous.

(2) Production of Solid Electrolyte Layer and Solid Electrolyte Powder

Using a 350 µm thick sheet-shaped $Li_2O$-stabilized β"-alumina represented by a composition formula $Na_{1.6}Li_{0.34}Al_{10.66}O_{17}$, the surface of this sheet-shaped $Li_2O$-stabilized β"-alumina on which a positive electrode layer was to be formed was dry polished with "Diaceramica for dry polishing, particle size: #100" manufactured by Sanwa Kenma, Ltd., thus forming a solid electrolyte layer. Separately, a bulk of $Li_2O$-stabilized β"-alumina was ground with a planetary ball mill and the ground product was passed through a sieve with 10-µm openings, thus producing a solid electrolyte powder (average particle diameter D50=1.5 µm). All the above operations were conducted in an environment of the dew point minus 50° C. or below.

(3) Measurement of Arithmetic Mean Roughness Ra

The arithmetic mean roughness Ra of the surface of the solid electrolyte layer was determined by measurement with contact-type surface profile measuring instrument (item number "ET4000A" manufactured by Kosaka Laboratory Ltd.) according to the method described in Rules and Procedures for the Assessment of Surface Texture in JIS B 0633-2001 (ISO 4288-1966). In Example 1, the arithmetic mean roughness Ra of the surface of the solid electrolyte layer was 0.87 µm.

(4) Production of Test Cell

The positive-electrode active material precursor powder and solid electrolyte powder obtained in the above manners, and acetylene black (item number "Super C65" manufactured by Timcal) as a conductive agent were weighed in a ratio of 72:25:3 and mixed for 30 minutes using an agate mortar and an agate pestle. An amount of 10 parts by mass of polypropylene carbonate was added to 100 parts by mass of the obtained mixed powder, 30 parts by mass of N-methylpyrrolidinone was further added to the mixture, and the mixture was then stirred well with a planetary centrifugal mixer to form a slurry. The obtained slurry was applied to the dry-polished surface of the solid electrolyte layer to an area of 1 $cm^2$ and a thickness of 100 µm, and then dried at 70° C. for three hours. Next, the product was put into a carbon container and fired in an atmosphere of nitrogen gas at 625° C. for 30 minutes, thus forming a positive electrode layer while crystallizing the positive-electrode active material precursor powder. All the above operations were conducted in an environment of the dew point minus 50° C. or below. Next, a current collector formed of a 300-nm thick gold electrode was formed on the surface of the positive electrode layer using a sputtering system (item number "SC-701AT" manufactured by Sanyu Electron Co., Ltd.). Furthermore, in an argon atmosphere the dew point minus 70° C. or below, metallic sodium serving as a counter electrode was pressure-bonded to the surface of the solid electrolyte layer opposite to the surface thereof on which the positive electrode layer was formed. The obtained laminate was placed on a lower lid of a coin cell and covered with an upper lid to produce a CR2032-type test cell.

Example 2

A CR2032-type test cell was produced in the same manner as in Example 1 except that in producing a solid electrolyte layer in (2) described above, the surface of a sheet-shaped $Li_2O$-stabilized β"-alumina on which a positive electrode layer was to be formed was dry polished with "Diaceramica for dry polishing, particle size: #200" manufactured by Sanwa Kenma, Ltd. In Example 2, the arithmetic mean roughness Ra of the surface of the solid electrolyte layer was 0.76 µm.

Example 3

A CR2032-type test cell was produced in the same manner as in Example 1 except that in producing a solid electrolyte layer in (2) described above, the surface of a sheet-shaped $Li_2O$-stabilized β"-alumina on which a positive electrode layer was to be formed was dry polished with "Diaceramica for dry polishing, particle size: #50" manufactured by Sanwa Kenma, Ltd. In Example 3, the arithmetic mean roughness Ra of the surface of the solid electrolyte layer was 1.8 µm.

Example 4

A CR2032-type test cell was produced in the same manner as in Example 1 except that in producing a solid electrolyte layer in (2) described above, the surface of a sheet-shaped $Li_2O$-stabilized β"-alumina on which a positive electrode layer was to be formed was polished by sandblasting with a sandblaster (PNEUMA-BLASTER manufactured by Fuji Manufacturing Co., Ltd.,) using a SiC polish (particle size: #100). In Example 4, the arithmetic mean roughness Ra of the surface of the solid electrolyte layer was 3.2 µm.

Example 5

A CR2032-type test cell was produced in the same manner as in Example 1 except that in producing a solid electrolyte layer in (2) described above, the surface of a sheet-shaped $Li_2O$-stabilized β"-alumina on which a positive electrode layer was to be formed was polished by sandblasting with a sandblaster (PNEUMA-BLASTER manufactured by Fuji Manufacturing Co., Ltd.,) using a SiC polish (particle size: #50). In Example 5, the arithmetic mean roughness Ra of the surface of the solid electrolyte layer was 5.3 µm.

Comparative Example 1

A CR2032-type test cell was produced in the same manner as in Example 1 except that in producing a solid electrolyte layer in (2) described above, the surface of a sheet-shaped $Li_2O$-stabilized β"-alumina on which a positive electrode layer was to be formed was polished with "Diaceramica for dry polishing, particle size: #1500" manufactured by Sanwa Kenma, Ltd. In Comparative Example 1, the arithmetic mean roughness Ra of the surface of the solid electrolyte layer was 0.042 µm.

Example 6

A CR2032-type test cell was produced in the same manner as in Example 1 except that in the production of a test cell in (4) described above, a film of Bi—Zn alloy (25% by atom Bi and 75% by atom Zn) was deposited by magnetron sputtering, instead of forming a positive electrode layer. In this embodiment, Bi—Zn alloy functions as a negative-electrode active material (the same applies to Examples 7 and 8 and Comparative Example 2).

Example 7

A CR2032-type test cell was produced in the same manner as in Example 1 except that in producing a solid electrolyte layer in (2) described above, the surface of a sheet-shaped $Li_2O$-stabilized β"-alumina on which a positive electrode layer was to be formed was dry polished with "Diaceramica for dry polishing, particle size: #300" manufactured by Sanwa Kenma, Ltd., and that in the production of a test cell in (4) described above, a film of Bi—Zn alloy (25% by atom Bi and 75% by atom Zn) was deposited as a negative electrode layer by magnetron sputtering, instead of forming a positive electrode layer. In Example 7, the arithmetic mean roughness Ra of the surface of the solid electrolyte layer was 0.47 μm.

Example 8

A CR2032-type test cell was produced in the same manner as in Example 4 except that in the production of a test cell in (4) described above, a film of Bi—Zn alloy (25% by atom Bi and 75% by atom Zn) was deposited by magnetron sputtering, instead of forming a positive electrode layer.

Comparative Example 2

A CR2032-type test cell was produced in the same manner as in Comparative Example 1 except that in the production of a test cell in (4) described above, a film of Bi—Zn alloy (25% by atom Bi and 75% by atom Zn) functioning as a negative electrode layer was deposited by magnetron sputtering, instead of forming a positive electrode layer.

<Charge and Discharge Test>

Figure 2:
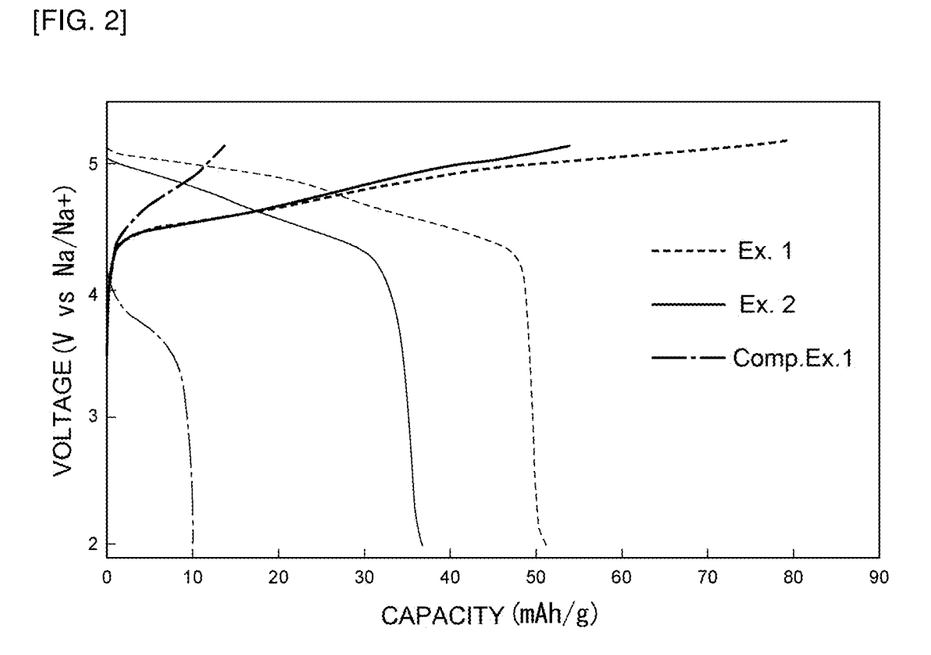
FIG. 2 is a graph showing first charge and discharge curves of test cells produced in Examples 1 and 2 and Comparative Example 1.

The CR2032-type test cells produced in Examples 1 to 5 and Comparative Example 1 were subjected to CC (constant-current) charging (release of sodium ions from the positive-electrode active material) from an open circuit voltage to 5.2 V at 60° C. and determined in terms of the amount of electricity charged to the positive-electrode active material per unit mass (first charge capacity). Next, the test cells were CC discharged from 5.2 V to 2 V and determined in terms of the amount of electricity discharged from the positive-electrode active material per unit mass (first discharge capacity). FIG. 2 shows first charge and discharge curves of the test cells produced in Examples 1 and 2 and Comparative Example 1. Furthermore, Table 1 shows the results of the discharge capacities, discharge capacity retentions, and rapid charge/discharge characteristics of the test cells produced in Examples 1 to 5 and Comparative Example 1.

The CR2032-type test cells produced in Examples 6 to 8 and Comparative Example 2 were subjected to CC (constant-current) charging (absorption of sodium ions to the negative-electrode active material) from an open circuit voltage to 0.2 V at 60° C. and determined in terms of the amount of electricity charged to the negative-electrode active material per unit mass (first charge capacity). Next, the test cells were CC discharged from 0.2 V to 1.5 V and determined in terms of the amount of electricity discharged from the negative-electrode active material per unit mass (first discharge capacity). Table 2 shows the results of the discharge capacities, discharge capacity retentions, and rapid charge/discharge characteristics of the test cells produced in Examples 6 to 8 and Comparative Example 2.

TABLE 1

|  |  | Example 1 | Example 2 | Example 3 | Example 4 | Example 5 | Comparative Example 1 |
|---|---|---|---|---|---|---|---|
|  | Solid Electrolyte Layer Arithmetic Mean Roughness Ra (μm) | 0.87 | 0.76 | 1.8 | 3.2 | 5.3 | 0.042 |
| Cell Characteristics | Discharge Capacity (mAh/g) (0.01 C) | 51 | 37 | 71 | 76 | 71 | 10 |
|  | Discharge Capacity Retention (%) (After 5 cycles/First) | 51.0 | 48.6 | 76.1 | 76.4 | 72.0 | 4.8 |
|  | Rapid CHG/DISCHG Char (%) (0.1 C/0.01 C) | 72.5 | 48.6 | 81.1 | 82.9 | 75.2 | 11.0 |

TABLE 2

|  |  | Example 6 | Example 7 | Example 8 | Comparative Example 2 |
|---|---|---|---|---|---|
|  | Solid Electrolyte Layer Arithmetic Mean Roughness Ra (μm) | 0.87 | 0.47 | 3.2 | 0.042 |
| Cell Characteristics | Discharge Capacity (mAh/g) (0.1 C) | 239 | 212 | 271 | 181 |
|  | Discharge Capacity Retention (%) (After 5 cycles/First) | 95.4 | 86.1 | 98.1 | 72.0 |
|  | Rapid CHG/DISCHG Char (%) (1 C/0.1 C) | 65.0 | 61.2 | 78.1 | 52.1 |

The discharge capacity in Table 1 indicates the first discharge capacity evaluated at a C rate of 0.01 C, the discharge capacity retention in Table 1 indicates the rate of retention of discharge capacity after five cycles relative to the first discharge capacity ((After 5 cycles/First)×100(%)), each evaluated at a C rate of 0.01 C, and the rapid charge/discharge characteristic in Table 1 indicates the ratio of the first discharge capacity at a C rate of 0.1 C to the first discharge capacity at a C rate of 0.01 C ((0.1 C/0.01 C)×100(%)). As shown in Table 1, the discharge capacities in Examples 1 to 5 were 37 mAh/g or more, but the discharge capacity in Comparative Example 1 was as poor as 10 mAh/g. Furthermore, the discharge capacity retentions in Examples 1 to 5 were 48.6% or more, but the discharge capacity retention in Comparative Example 1 was as poor as 4.8%. Moreover, the rapid charge/discharge characteristics in Examples 1 to 5 were 48.6% or more, but the rapid charge/discharge characteristic in Comparative Example 1 was as poor as 11.0%.

The discharge capacity in Table 2 indicates the first discharge capacity evaluated at a C rate of 0.1 C, the discharge capacity retention in Table 2 indicates the rate of retention of discharge capacity after five cycles relative to the first discharge capacity ((After 5 cycles/First)×100(%)), each evaluated at a C rate of 0.1 C, and the rapid charge/discharge characteristic in Table 2 indicates the ratio of the first discharge capacity at a C rate of 1 C to the first discharge capacity at a C rate of 0.1 C ((1 C/0.1 C)×100(%)). As shown in Table 2, the discharge capacities in Examples 6 to 8 were 212 mAh/g or more, but the discharge capacity in Comparative Example 2 was 181 mAh/g less than in Examples 6 to 8. Furthermore, the discharge capacity retentions in Examples 6 to 8 were 86.1% or more, but the discharge capacity retention in Comparative Example 2 was 72.0% less than in Examples 6 to 8. Moreover, the rapid charge/discharge characteristics in Examples 6 to 8 were 61.2% or more, but the rapid charge/discharge characteristic in Comparative Example 2 was 52.1% less than in Examples 6 to 8.

REFERENCE SIGNS LIST

1 . . . all-solid-state sodium ion secondary battery
2 . . . solid electrolyte layer
2a, 2b . . . first, second principal surface
3 . . . positive electrode layer
4 . . . negative electrode layer
5, 6 . . . first, second current collector layer

The invention claimed is:

1. An all-solid-state sodium ion secondary battery comprising:
a solid electrolyte layer having a first principal surface and a second principal surface opposite each other and made of a sodium ion-conductive oxide;
a positive electrode layer provided on the first principal surface of the solid electrolyte layer; and
a negative electrode layer provided on the second principal surface of the solid electrolyte layer, wherein
the first principal surface has an arithmetic mean roughness Ra of 1.8 μm or more and 3.2 μm or less,
the thickness of the positive electrode layer is in a range of 10 μm to 150 μm,
the positive electrode layer contains a positive-electrode active material including sodium transition metal phosphate crystals containing Na, M (where M represents at least one transition metal element selected from Cr, Fe, Mn, Co, V, and Ni), P, and O,
the solid electrolyte layer contains at least one solid electrolyte selected from the group consisting of β-alumina, β"-alumina, and NASICON crystals, and
the negative electrode layer contains a negative-electrode active material including crystals containing at least one selected from Nb and Ti, and O, metallic crystals of at least one selected from Sn, Bi, and Sb, and alloy crystals containing at least one selected from Sn, Bi, and Sb.

2. The all-solid-state sodium ion secondary battery according to claim 1, wherein the second principal surface has an arithmetic mean roughness Ra of 0.47 μm or more.

3. The all-solid-state sodium ion secondary battery according to claim 1, wherein the solid electrolyte layer has a thickness of not less than 10 μm and not more than 500 μm.

4. The all-solid-state sodium ion secondary battery according to claim 1, wherein the positive-electrode active material is a sintered body of a positive-electrode active material precursor glass powder.

* * * * *